United States Patent [19]
Ueno

[11] 4,449,956
[45] May 22, 1984

[54] CONSTANT-VELOCITY UNIVERSAL JOINT
[76] Inventor: Yasuo Ueno, 3-17-3-209 Higashinogawa, Komae-shi, Tokyo, Japan
[21] Appl. No.: 274,151
[22] Filed: Jun. 16, 1981
[30] Foreign Application Priority Data Jun. 17, 1980 [JP] Japan .................................. 55-81661
Jun. 17, 1980 [JP] Japan .................................. 55-81660
Oct. 28, 1980 [JP] Japan ................................ 55-151044

[51] Int. Cl.³ .............................................. F16D 3/30
[52] U.S. Cl. .................................... 464/149; 464/142; 464/157; 464/904
[58] Field of Search ............... 464/141, 142, 147, 149, 464/151, 152, 155, 156, 904, 157

[56] References Cited
U.S. PATENT DOCUMENTS

| 2,060,473 | 11/1936 | Schumb .............................. 464/142 |
| 2,149,352 | 3/1939 | Leaman .............................. 464/142 |
| 2,343,839 | 3/1944 | Austin .............................. 464/149 X |
| 3,564,867 | 2/1971 | Rethwisch .......................... 464/141 |

FOREIGN PATENT DOCUMENTS 110543 6/1925 Switzerland ........................ 464/147
661406 11/1951 United Kingdom ................ 464/151
731973 6/1955 United Kingdom ................ 464/151

Primary Examiner—Stuart S. Levy
Assistant Examiner—Daniel P. Stodola
Attorney, Agent, or Firm—Kurt Kelman

[57] ABSTRACT

In a constant-velocity universal joint, the rotary motion to be transmitted from the driving shaft to the driven shaft through the medium of rotary members disposed between the opposed lateral contact surfaces of the adjacent yokes of the driving shaft and the driven shaft is made to act on the rotary members in the tangential direction of the pitch circle of the rotary members when the lateral contact surfaces of the adjacent yokes are formed parallel to the normal axes, thereby enabling the rotary motion to be transmitted with high efficiency without entailing any loss due to occurrence of resultant force. The retainer for holding in position the rotary members can be positively kept in the plane perpendicular to the bisector of the intersecting angle of the axes of the two shafts when the surfaces formed in the retainer for guiding the yokes are curved, thereby allowing the constancy of the angular-velocity of transmission of the rotary motion to be secured.

1 Claim, 12 Drawing Figures

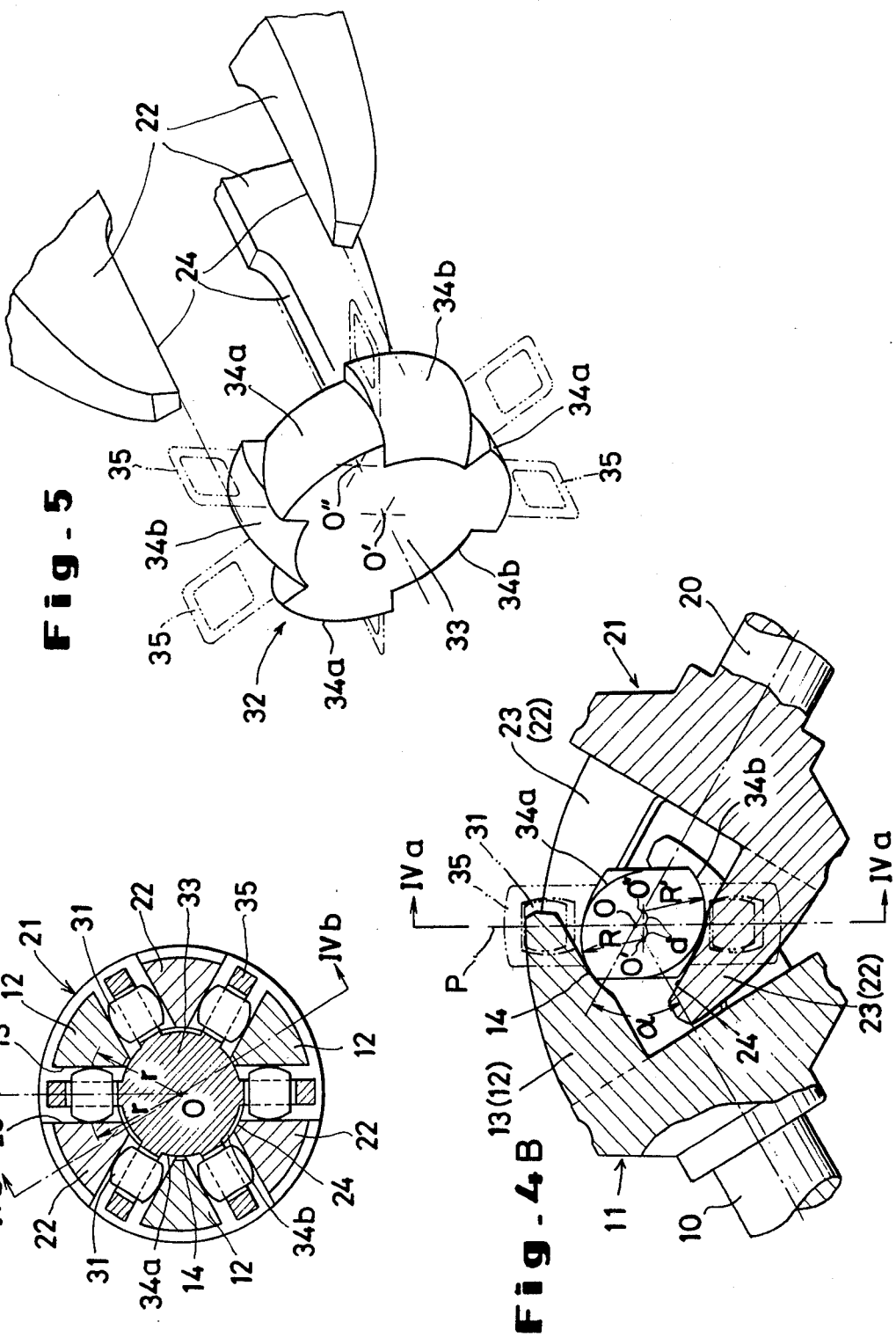

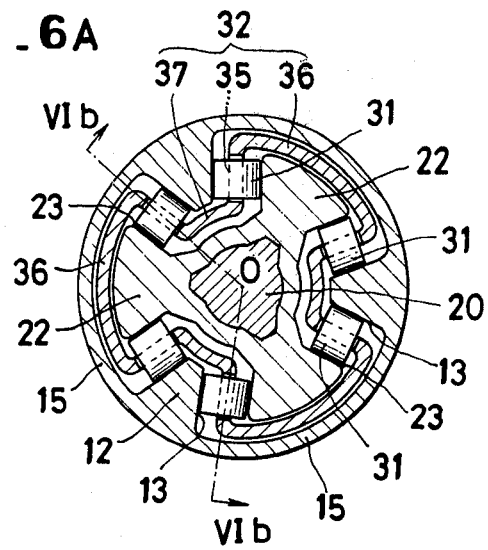
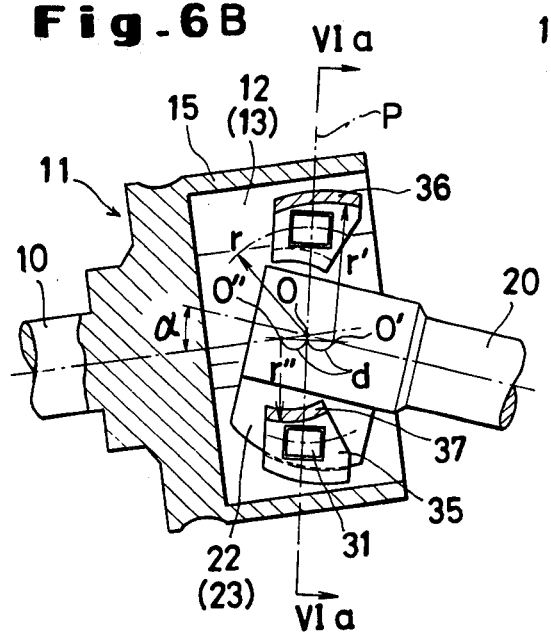
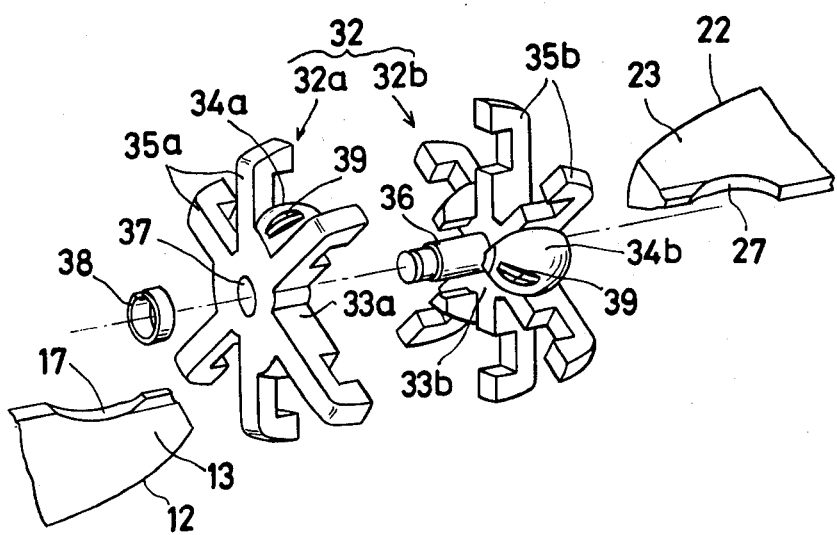

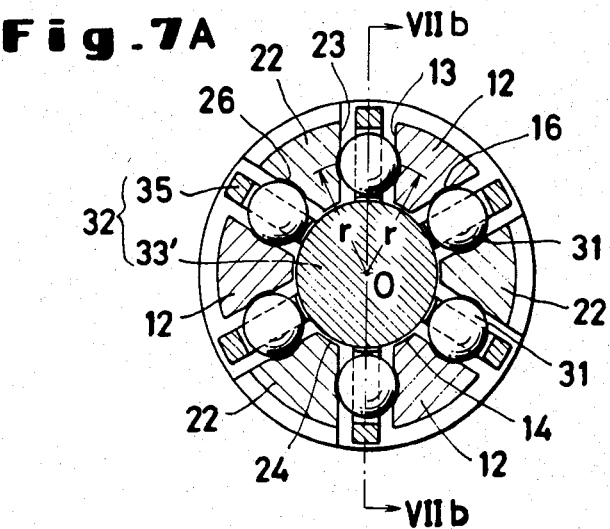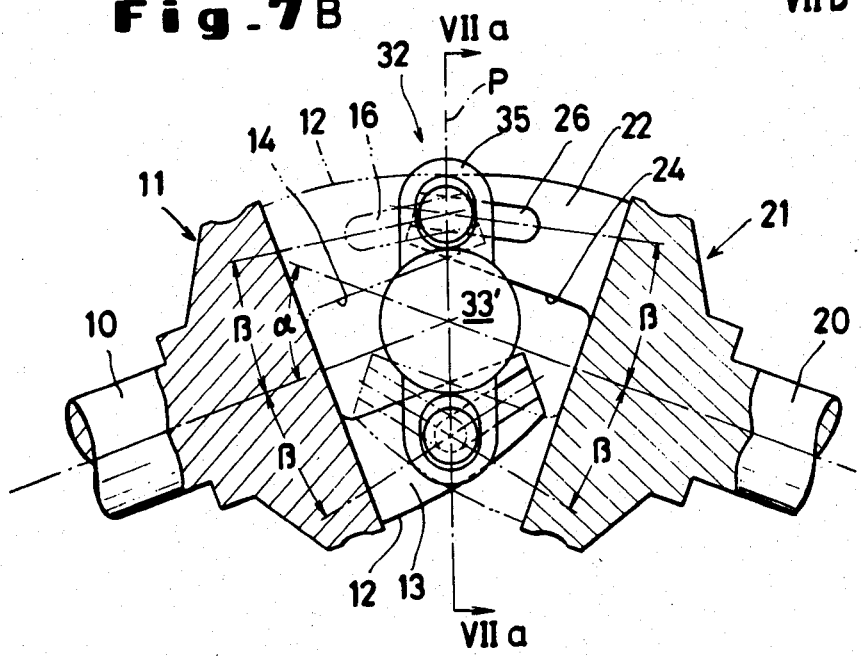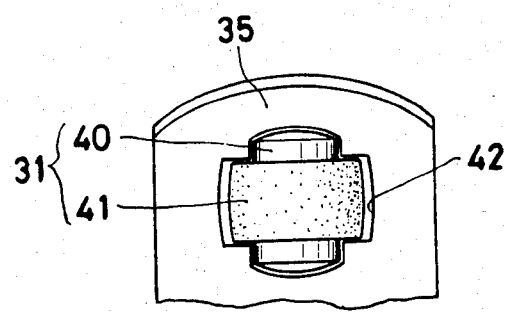

CONSTANT-VELOCITY UNIVERSAL JOINT

BACKGROUND OF THE INVENTION:

This invention relates to a constant-velocity universal joint which enables the rotary motion of the driving shaft to be smoothly transmitted at a constant angular-velocity to the driven shaft with very little loss of transmission of rotary motion even when the axes of the two coupled shafts intersect at an angle.

The universal joints which are extensively used in almost all classes of machinery including machine tools and control devices and, typically, propelling shafts in automobiles can be roughly divided into non-constant-velocity joints which entail cyclic change in the angular velocity of rotary motion in transmission as typified by the Hooke's joint consisting of two yokes attached to their respective shafts and a spider having the yokes rotatably connected thereto, and constant-velocity joints which transmit rotations at a constant angular-velocity by use of a transmission element formed of a plurality of balls as typified by the Weiss' joint and the Rzeppa's joint.

It is possible to compensate for the variation in angular velocity and attain constant angular-velocity transmission of rotary motion by using two Hooke's joints (as observed in the double Cardan joint and the tractor joint, for example). However, these modified joints are invariably deficient in efficiency and durability and suffer from a common defect of generating vibration.

For one joint to be able to provide constant angular-velocity transmission of rotary motion, there is an essential requirement that a transmission element such as is mentioned above should always exist in the plane orthogonal to the bisector of the intersecting angle of the driving and driven shafts. Although the aforementioned Weiss' joint and Rzeppa's joint have been designed specifically to satisfy this requirement, they are complicated in structure and very difficult to manufacture. In recent years, the spread of automobiles has encouraged promotion of technical developments on constant-velocity joints capable of highly efficient transmission of rotary motion. At present, the Birfield and the tripot universal joints predominate over other types of universal joints in popularity.

The Birfield type joint, in its general structure, comprises a cup-shaped outer shell containing grooves in the inner surface thereof, an inner member containing grooves in the outer surface thereof, and balls disposed within the annular cavity occurring between the opposed grooves of the outer shell and the inner member and retained in position by a cage. In this joint, transmission of torque is effected at the points at which the opposed surfaces of the grooves are in contact with the balls. The two points of contact occurring on each ball fall in the line forming a considerably large angle with the tangential line of the pitch circle of the balls. This fact implies that the vectors to be described on the line (forces exerted by the opposed grooves on the ball) are greater than the vectors on the tangential line of the pitch circle of the balls (forces of transmission between the shafts) and that, therefore, this joint inevitably suffers from the loss corresponding to the difference between the vectors. Further, since the points of contact at which the balls are in contact with the groove surfaces of the outer shell fall in a different circle from that in which the balls are in contact with the groove surfaces of the inner members, sliding motion is produced on the surface of at least one of the grooves. The sliding motion brings about various disadvantages such as, for example, frictional wear of the surfaces of the balls and the grooves and the phenomenon of locking of the joint.

The tripot type joint consists of a yoke member formed on the driving shaft and provided with three radially formed guide grooves, and rotary members attached radially to the driven shaft and set in the guide grooves. When the rotary motion of the driving shaft is transmitted to the driven shaft while the axes of the two shafts are out of coincidence, the joint generates vibration because the axis of the driven shaft is displaced by a cycle of 120°. As the two axes assume a large intersecting angle, the bending moment is proportionately increased. This defect has prevented the intersecting angle of the axes of the two shafts from being increased to any large extent.

SUMMARY OF THE INVENTION

An object of this invention is to provide a constant-velocity universal joint which permits the rotary motion of the driving shaft to be smoothly transmitted without either generating vibration or entailing any notable transmission loss to the driven shaft even when the axes of the two shafts intersect at an angle, which enjoys excellent durability and which provides highly efficient transmission of rotary motion even when the intersecting angle of the axes of the two shafts gains in sharpness.

To accomplish the object described above according to the present invention, there is provided a constant-velocity universal joint which comprises a yoke member fastened to the driving shaft and provided with circumferentially spaced yokes, a yoke member fastened to the driven shaft and provided with yokes circumferentially spaced so as to be meshed at a distance with the yokes of the yoke member on the driving shaft, rotary members set in position between the yokes of the driving shaft and the driven shaft, and a retainer serving to retain the rotary members and the inner edges of the yokes of the two yoke members.

The yokes in the two yoke members are constructed so that when the two yoke members are meshed, the lateral faces of the yokes in one yoke member run parallel to the opposed lateral faces of the yokes in the other yoke member. As a result, the opposed lateral faces of the two sets of yokes and the surfaces of the respective rotary members can be brought into contact in the tangential lines of the pitch circle of the rotary members which are set between the two sets of yokes. Thus, the universal joint of this invention eliminates the loss of transmission of the rotary motion. Further, since the guide surfaces of the retainer serving to retain in position the inner edges of the two sets of yokes are formed of two spherical surfaces not sharing a common center, the retainer which is not positively supported with respect to the yokes can be positively retained in the plane orthogonal to the bisector of the intersecting angle of the two shafts to ensure the constancy of angular-velocity between the rotations of the two shafts.

Owing to the construction described above, the universal joint of this invention provides stable transmission of rotary motion from the driving shaft to the driven shaft at low transmission loss without generation of vibration no matter what relative positions the two shafts may assume. It excels in durability and enjoys simplicity of structure and, therefore, can be manufactured inexpensively. The invention, accordingly, proves highly practicable.

The other objects and characteristics of the present invention will become apparent from the further disclosure of the invention to be given hereinafter with reference to the accompanying drawings.

BRIEF EXPLANATION OF THE DRAWINGS

FIGS. 4A and 4B are a front view and a side view respectively showing in cross section the universal joint of FIG. 3 of this invention held in a meshed state.

FIG. 5 is a perspective diagram showing in part the general construction of the guide surfaces of the retainer in FIG. 3.

FIGS. 6A and 6B are a front view and a side view respectively showing in cross section a constant-velocity universal joint in the second embodiment of this invention.

FIGS. 7A and 7B are a front view and a side view respectively showing in cross section a constant-velocity universal joint in the third embodiment of this invention.

FIG. 8 is a perspective diagram showing a typical method for the manufacture of a retainer for use in the universal joint of the present invention.

FIG. 9 is a front view showing other typical rotary members for use in the universal joint of the present invention.

DESCRIPTION OF THE PREFERRED EMBODIMENT

This invention relates to a constant-velocity universal joint which permits smooth transmission of rotary motion with very little transmission loss without entailing the phenomenon of locking.

Figure 1:
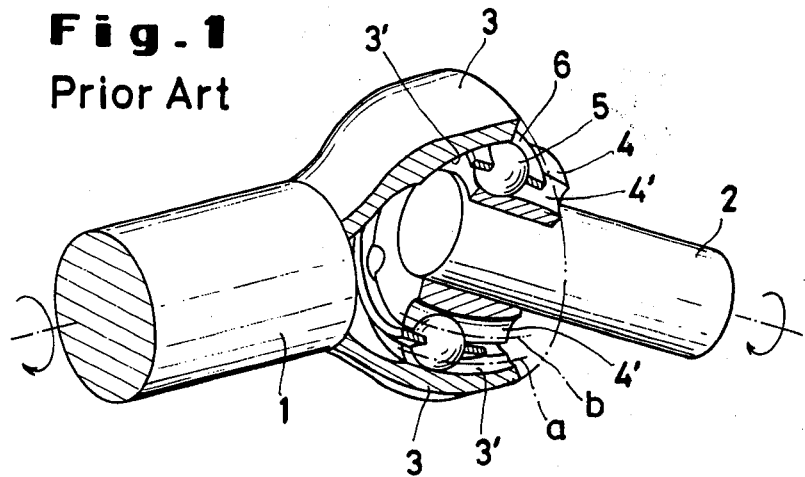
FIGS. 1 and 2 are perspective explanatory diagrams of conventional constant-velocity universal joints.
Figure 2:
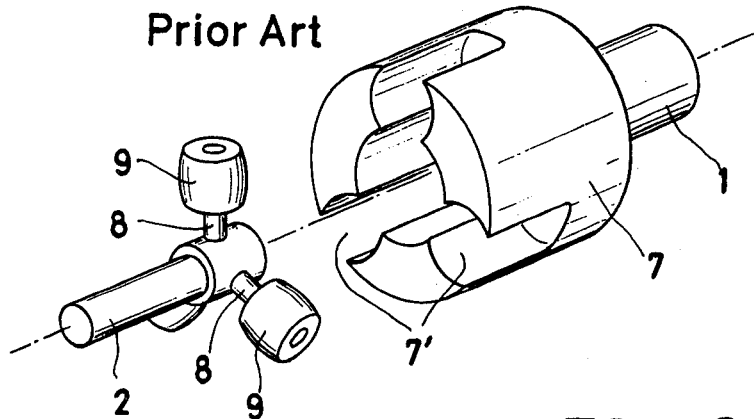

FIGS. 1 and 2 illustrate conventional constant-velocity universal joints.

The Birfield type universal joint illustrated in FIG. 1 comprises an outer shell 3 formed at the leading end of the driving shaft 1 and provided with a groove 3', an inner member 4 formed at the leading end of the driven shaft 2 and provided with a groove 4', and balls 5 retained in position by a cage 6 and set between the opposed grooves 3', 4' of the outer shell and the inner member. The grooves 3', 4' form in the axial direction of the cage 6 parts of spheres whose centers coincide at the intersection of the axes of the two shafts 1, 2. In this universal joint, transmission of torque is effected by the wall surface of the groove 3' of the outer shell keeping contact with the balls 5 each at one point on the respective tangential lines a and the wall surface of the groove 4' of the inner member keeping contact with the balls 5 each at one point on the respective tangential lines b. The forces thus exerted on the balls do not fall in the tangential directions of the pitch circle of the balls but give rise to excess forces (loss) fairly inclined from the tangential directions and bring about degradation of transmission efficiency. Moreover, since the grooves 3', 4' of the outer shell and the inner member with which the balls 5 keep in contact with different radiuses, the balls produce sliding contact instead of rolling contact on at least one of the wall surfaces of the grooves. This sliding contact results in various defects such as frictional wear of the balls and the grooves and occurrence of the phenomenon of locking. This disadvantage becomes particularly conspicuous when the two shafts assume a large intersecting angle.

The tripot type universal joint illustrated in FIG. 2 comprises a yoke member 7 formed at the leading end of the driving shaft 1 and provided with radially inserted guide grooves 7' and rotary members 9 slidably attached to their respective support arbors 8 formed at the leading end of the driven shaft 2 and adapted to fit into the guide grooves 7' of the yoke member 7. In this universal joint, when a rotary motion is imparted to the driving shaft while the axes of the coupled shafts intersect at an angle, since the axis of the driven shaft 2 is displaced at a fixed cycle of 120', the joint produces vibration and a large bending moment. Thus, this universal joint has suffered a disadvantage that the axes of the driving shaft and the driven shaft are not allowed to form a sharp intersecting angle.

The constant-velocity universal joint of this invention, which eliminates the various drawbacks suffered by the conventional constant-velocity universal joints including the aforementioned well-known joints and permits smooth transmission of rotary motion with high efficiency, will be described below.

Figure 3:
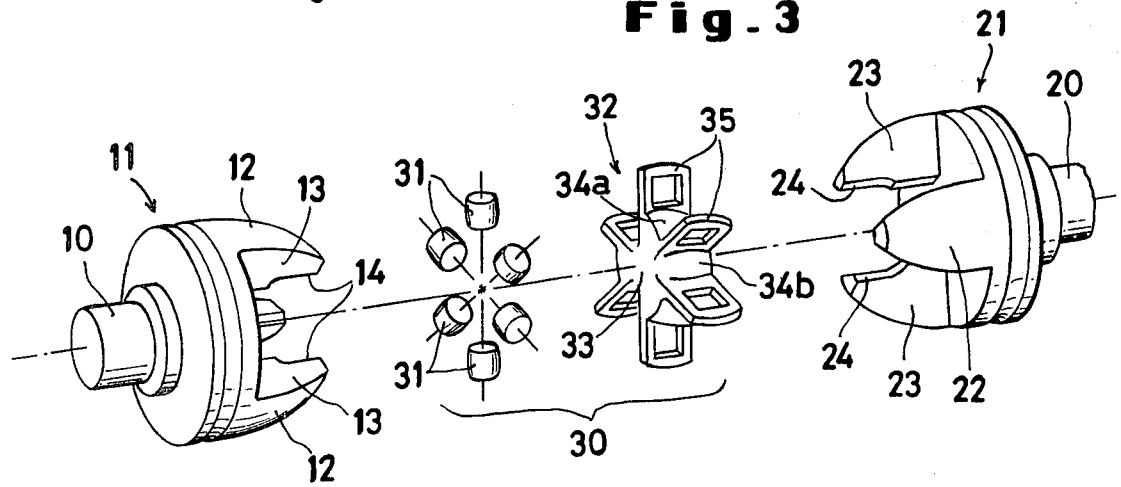
FIG. 3 is perspective diagram illustrating in a disassembled manner a constant-velocity universal joint in one embodiment of this invention.

The universal joint as the first embodiment of this invention, as illustrated in FIGS. 3 and 4, comprises a yoke member 11 formed at the leading end of the driving shaft 10 and provided with three axially protruding yokes 12 circumferentially spaced with a fixed pitch, a yoke member 21 formed at the leading end of the driven shaft 20 to be connected with the driving shaft 10 at an intersecting angle $\alpha$ and provided with three axially protruding yokes 22 circumferentially spaced with the same pitch as the yokes 12 of the driving shaft, and a transmission member 30 consisting of rotary members 31 retained in position by a retainer 32. These component parts are adapted so that when the yokes 22 of the yoke member 21 are inserted into and meshed with the circumferential spaces formed between the yokes 12 of the other yoke member 11, the yokes adjacent in the circumferential direction give rise to gaps which admit the rotary members 31. Further, the circumferentially lateral surfaces of the yokes 12, 22, namely the surfaces 13, 23 of the yokes exposed to contact with the rotary members 31, are parallel to the normal axes n of the rotary members 31 (the lines perpendicularly intersecting the tangential lines of their pitch circle) admitted therebetween. Further in this case, the gaps formed between the opposed surfaces 13, 23 of the adjacent yokes for admitting the rotary members 31 are given a width nearly equal to the diameter of the rotary members 31. In the illustrated embodiment, the rotary members 31 are in the shape of slightly bulged cylinders like barrels. Naturally, they may be formed in the shape of cylinders having side walls straight longitudinally.

The transmission member 30 comprises a retainer 32 formed of a guide member 33 provided with spherical surfaces for retaining the inner edges 14, 24 of the adjacent yokes 13, 23 of the yoke members held in mesh with each other and frames 35 radially extended from the guide member 33, and rotary members 31 held in position on the pitch circle of a radius r in the plane perpendicular to the axes of the retainer 32. In the illustrated embodiment, the spherical surfaces 34 of the guide member comprise the surfaces 34a for holding the yokes 12 on the driving shaft and the surfaces 34b for holding the yokes on the driven shaft as illustrated in FIGS. 4A and 5, and the two sets of surfaces are equivalent to parts of the spheres of an equal or unequal radii R, R' having respective centers O', O" deviating by a distance d in the axial direction of the guide member 33 from the orthotomic plane P orthogonal to the bisector of the intersecting angle α of the two shafts.

Now, the operation of the first embodiment of this invention constructed as described above will be explained below.

The universal joint is assembled by meshing the yoke members 11, 21 of the driving shaft 10 and the driven shaft 20 with each other and setting the rotary members in position between the parallel contact surfaces 13, 23 of the adjacent yokes 12, 22. When the driving shaft 10 of this universal joint is rotated, the contact surfaces of the yokes 12 come into contact with the respective rotary members 31 in the tangential lines of their pitch circle, which perpendicularly intersect the normal axes n of the rotary members 31 and, through the points of contact thus formed, transmit the rotary force to the rotary members 31. At the same time, the rotary members 31 transmit the rotary force to the yokes 22 with which the rotary members 31 are held in contact in the aforementioned tangential lines, with the result that the rotary force of the driving shaft 10 is transmitted to the driven shaft 20. In short, the rotary members 31 are brought into contact with the contact surfaces 13, 23 of the adjacent yokes 12, 22 in the tangential lines of the pitch circle and, theoretically, no excess force (loss) is allowed to occur in the force being transmitted through the medium of these rotary members 31.

The guide member 33 of the retainer 32 possesses two sets of spherical surfaces 34a, 34b of an equal or unequal radii R, R' having respective centers O', O" which deviate equally from the intersection O of the axes of the two shafts, and the spherical surfaces 34a serve to retain the yokes 12 of the driving shaft and the spherical surfaces 34b the yokes 22 of the driven shaft respectively. Therefore, the retainer 32 positively assumes its position in the orthotomic plane P perpendicular to the bisector of the intersecting angle α of the two axes when the two shafts 10, 20 are in alignment, or even intersect at an angle. Since the points O, O' fall on the axis of the driving shaft 10, the points O, O" fall on the axis of the driven shaft, and the length between the points O, O' and that between the points O, O" are equal, the line O' to O" runs always parallel with the bisector of the intersecting angle of the two shafts. Consequently, the retainer 32 always assumes its position in the orthotomic plane P. Thus, the constancy of the angular-velocity of motion transmission can be secured. Even when the two shafts happen to produce a plunging motion because of their simultaneous axial motion, the rotary members 31 can absorb this plunging motion by their rolling motion. Thus, the rotary members are not exposed to any excessive force.

FIGS. 6A and 6B represent a second embodiment which retains the basic construction, operation and effect of this invention and incorporates modifications to the yoke members and the transmission member.

In this embodiment, the yokes 12 on the driving shaft are fastened to the inner surface of a cylindrical member 15 as spaced with a fixed pitch and the yokes 22 on the driven shaft are directly formed on the peripheral surface of the driven shaft 20. Also in this construction, the opposed surfaces of the adjacent yokes 12, 22 kept in a mutually meshed condition are parallel to the normal axes of the rotary members 31 admitted therebetween and run parallel to each other in the axial direction. Since the yokes 22 are directly formed on the outer surface of the driven shaft 20, the retainer 22 of the foregoing embodiment cannot be inserted anywhere. Instead, two sets of guide members are used, one set being outer guide members 36 and the other set being inner guide members 37, which are arranged in such a manner that the outer edges of every other adjacent supporting frame 35 are connected by means of the outer guide members 36 and the inner edges of the other adjacent supporting frame 35 are connected by means of the inner guide members 37 in an alternating manner as illustrated, so as to form a zigzag retainer 32 conforming to the space to be formed between the opposed surfaces of the yokes 12, 22 when the yokes are meshed with each other. Further, the inner surfaces of the outer guide members 36 are formed in a sphere of a radius r' having the center O' deviating by a distance d in a perpendicular direction from the plane P, and the outer edges of the yokes 22 of the driven shaft are curved substantially parallel to the sphere mentioned above. On the other hand, the outer surfaces of the inner guide members 37 are formed in a sphere of a radius r" having the center O" deviating by a distance d in the opposite direction from the point O' from the plane P and having dimensions which permit the outer surfaces thereof to come in contact with the inner edges of the yokes 12 of the driving shaft. The radius r' is smaller than the inside diameter of the cylindrical member 15 and the radius r' is larger than the radius of the driven shaft 20.

The operation of the second embodiment constructed as described above is similar to that of the first embodiment. No matter how much the intersecting angle of the axes of the two shafts may be changed, the rotary motion of the driving shaft 10 is transmitted from the contact surfaces of the yokes 12 to the rotary members 31 and to the contact surfaces of the yokes 22 on the driven shaft, invariably in the tangential lines of the pitch circle of the rotary members 31. Moreover, since the outer and inner guide members 36, 37 of the retainer 32 have their surfaces formed to fall completely in respective spheres, the retainer 32 does not fall in the axial direction but invariably assumes its position in the orthotomic plane P perpendicular to the bisector of the intersecting angle α of the axes of the two shafts even when an external force is exerted to bear upon the retainer 32 in a direction away from the plane P, namely, even when the retainer 32 is forced to produce a motion from the center O along the arc of a radius r with respect to the diagram of FIG. 6B. This is because the inner surfaces of the outer guide members 36 come into contact with the outer edges of the yokes 22 and the outer surfaces of the inner guide members 37 come into contact with the inner edges of the yokes 12. Owing to the combination of all these operations, the transmission of the rotary motion can be accomplished with very little transmission loss and, at the same time, the constancy of the angular-velocity of transmission can be safely maintained. This construction has advantages that a lubricant can be retained in the cylindrical member 15 of the driving shaft 10, and when the universal joint is protected with a dust cover (not shown), it is not damaged by the yokes in rotary motion. Although in this embodiment, the rotary members 31 formed in the shape of cylinders having straight side walls are used, they may, of course, be in the shape of slightly bulged cylinders as in the first embodiment.

In the third embodiment illustrated in FIGS. 7A and 7B, one sphere is used to serve as the guide member for the retainer 32. The surface of this sphere can retain the inner edges 14, 24 of the yokes 12, 22 in sliding contact. In this case, guide grooves 16, 26 of a slight gradient (angle $\beta$) are formed on the contact surfaces 13, 23 of the yokes 12, 22 so that, when the yokes are brought into a meshed state, spherical rotary members 31 may be admitted between the opposed grooves 16, 26 at the intersecting points thereof. Further, clearances are formed on openings of the retainer frames 35 in the radial direction of the retainer.

In this embodiment, since the spherical guide member 33' supports the yokes, the points at which the contact surfaces of the yokes 12, 22 come into contact with the respective guide grooves 16, 26 always remain in the plane P perpendicular to the bisector of the intersecting angle $\alpha$ of the axes of the two shafts despite a change in the intersecting angle of the axes of the shafts. By the rotary members thus positioned, therefore, the retainer 32 is always retained in the plane P to ensure the constancy of the angular-velocity of transmission of motion. The operation of the present embodiment in the transmission of rotary motion from the yokes of the driving shaft through the medium of the rotary members 31 to the yokes on the driven shaft is similar to that of the foregoing embodiment. In the joint having such a construction, the rotary members 31 are always retained at the intersections of the guide grooves 16, 26, so as not to fall in the lateral direction. Since the contact areas on which the rotary members are in contact with the guide grooves can be made relatively longer when the radii of curvature of the guide grooves 16, 26 and the rotary members 31 are appropriately determined, the transmission of rotary motion can be efficiently effected. When the two shafts happen to produce a plunging motion owing to their simultaneous axial motion, the points of contact on the guide grooves 16, 26 deviate in their radial direction. This deviation is absorbed by the radial clearances which are provided on openings of the retainer frames 35.

In the third embodiment are used spherical rotary members 31. Such spherical rotary members may, of course, be applied to the first and second embodiments in the place of the cylindrical rotary members. Although the spherical rotary members 31 can somewhat easily be produced, great rotary motion cannot be transmitted because the rotary members 31 come in point-contact with the contact surfaces 13, 23 of the yokes 12, 22.

The manufacture of the retainer 32 of this embodiment may be accomplished by a method which comprises first producing the guide member 33' and subsequently welding the frames 35 radially to the guide member or a method which comprises first cutting a star-shaped piece from a disc-shaped work blank and subsequently drilling holes one each through the projecting fins in the tangential directions. The former method has a disadvantage that the welding is difficult work and the welded portions are vulnerable to torsional impacts. The latter method has a serious problem that the boring of holes is extremely difficult because of work spaced limited by the adjacent retainer frames.

To overcome all these troubles, the present invention facilitates this manufacture by producing the retainer 32 in the form of two segments 32a, 32b divided in a plane perpendicular to the axis thereof, as illustrated in FIG. 8. To be more specific, the two segments are respectively composed of halved guide members 33a, 33b, halved frames 35a, 35b and mutually fittable spheres 34a, 34b, with a shaft bar 36 formed on the guide member 33b and a perforation 37 for the shaft bar formed in the other guide member 33b. When the segments are joined to each other, their union is secured by fastening a suitable stop member 38 to the leading end of the shaft bar 36 thrust out of the perforation 37. In this case, the halved sphere 34a for retaining the yokes 12 on the driving shaft is formed on the halved guide member 33a on the driving shaft and the halved sphere 34b for retaining the yokes 22 on the driven shaft is formed on the halved guide member 33b on the driven shaft, the inner edges of the yokes 12, 22 are given a diameter smaller than the diameter of the respective spheres, the inner edges are provided with circular recesses 17, 27 of a diameter substantially equalling the diameter of the spheres, and the corresponding spheres are provided in part with notches 39. These notches 39 are formed at positions such that they will admit the leading ends of the yokes 12, 22 when these yokes are inclined beyond the limits of the working intersecting angle of the axes of the two shafts 10, 20 tolerated during the service of the joint. Assemblage of the retainer 32 produced as described above is accomplished by first opposing the yokes 12, 22 respectively to the notches 39 in the two halved segments at an angle exceeding the limits of the working intersecting angle of the axes of the two shafts, pushing the two segments 32a, 32b along the notches until they fit into the recesses 17, 27 of the yokes 12, 22, then causing the two halved segments 32a, 32b of the retainer fitted to the yokes 12, 22 to be united to each other, and securing the thrust end of the shaft bar 36 to the frame 35 by means of the stop member 38 as described above. Once the retainer 32 is assembled as described above, the segments of the retainer 32 can no longer separate and the yokes 12, 22 cannot break their engagement within the limits of the working intersecting angle of the axes of the two shafts even when the two shafts happen to produce a plunging motion.

FIG. 9 is another embodiment of the rotary members 31 attached to the retainer 32, wherein the rotary members are each formed of a supporting shaft 40 and a resilient roller 41 disposed on the supporting shaft 40. The rotary members are fitted into the openings 42 formed in the frame 35 of the retainer 32. In this case, the openings 42 for admitting the resilient rollers 41 are given a slightly increased width, so that the rollers 41 while in rotation may be prevented from being worn by contact with the frame 35.

These resilient rollers 41 are also capable of absorbing vibration and other impacts which may possibly occur during the transmission of rotary motion from the driving shaft to the driven shaft.

According to the present invention, the transmission of rotary motion can be effected efficiently with very little loss because the contact surfaces 13, 23 of the yokes 12, 22 of the driving shaft and the driven shaft come into contact with the rotary members 31 at the points all falling perpendicularly to the normal axes of the rotary members. Further, the retainer can be positively kept in the orthotomic plane perpendicular to the bisector of the intersecting angle of the axes of the two shafts because the guide surfaces of the retainer serving to retain the yokes 12, 22 of the driving shaft and the driven shaft fall in spheres having two separate centers. Consequently, the constancy of the velocity of rotary motion transmission can be secured. The universal joint of this invention retains its performance intact even when the axes of the two shafts intersect at a great angle because the retainer is always kept in the aforesaid orthotomic plane despite any change in the intersecting angle of the axes. Since the rotary members by nature are not suffered to produce any sliding motion, no component part of the joint is abraded or exposed to the phenomenon of locking. Thus, the invention provides a constant-velocity universal joint which excels in durability and ability of transmission of rotary motion.

What is claimed is:

1. A constant-velocity universal joint for transmitting a rotary motion from a driving shaft to a driven shaft, comprising:
   a yoke member formed at the leading end of the driving shaft and provided with a plurality of yokes spaced circumferentially and containing flat lateral contact surfaces;
   a yoke member formed on the driven shaft and provided with a plurality of yokes meshed across circumferential gaps with the yokes of the yoke member of the driving member and containing lateral contact surfaces, the opposed lateral contact surfaces of the adjacent yokes of the yoke members of the driving shaft and the driven shaft held in a meshed condition being substantially parallel with the lines perpendicularly intersecting the tangential lines of the pitch circle of said yoke members; and
   a transmission member consisting of a plurality of rotary members each formed in the shape of a cylinder having a substantially straight longitudinal side wall and set in position in the gaps formed between the opposed lateral contact surfaces of the yokes of the yoke members of the driving shaft and the driven shaft, a retainer formed of frames for retaining the rotary members on the pitch circle thereof in the plane perpendicular to the axis of the retainer and a guide member serving to retain the frames at a fixed circumferential pitch and to hold in position the yokes of the driving shaft and the driven shaft, each of said rotary members being provided with a rotation axis in the radial direction of the retainer, said guide member being provided with two sets of spherical surfaces having respective centers deviating equally from the intersection of the axes of the driving and driven shafts in the opposite directions on the rotational axis of the retainer, one set of the spherical surfaces serving to retain the circumferential surfaces of the yokes of the driving shaft in the radial direction thereof and the other set thereof serving to retain the yokes of the driven shaft in the radial direction thereof.

* * * * *